US012761039B2

(12) United States Patent
Zhang et al.

(10) Patent No.: US 12,761,039 B2
(45) Date of Patent: Oct. 13, 2026

(54) VEHICLE NAVIGATION METHOD, VEHICLE AND STORAGE MEDIUM

(71) Applicant: BEIJING BAIDU NETCOM SCIENCE TECHNOLOGY CO., LTD., Beijing (CN)

(72) Inventors: Xin Zhang, Beijing (CN); Danni Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 18/063,168

(22) Filed: Dec. 8, 2022

(65) Prior Publication Data

US 2023/0104833 A1 Apr. 6, 2023

(30) Foreign Application Priority Data

Dec. 10, 2021 (CN) ......................... 202111518699.7

(51) Int. Cl.
*G01C 21/36* (2006.01)
*G01C 21/00* (2006.01)

(52) U.S. Cl.
CPC ..... *G01C 21/3697* (2013.01); *G01C 21/3658* (2013.01); *G01C 21/3848* (2020.08)

(58) Field of Classification Search
CPC ............ G01C 21/3697; G01C 21/3658; G01C 21/3848; G01C 21/367; G01C 21/28; G01C 21/3407; Y02T 10/40
USPC .......................................................... 701/400
See application file for complete search history.

(56) References Cited

U.S. PATENT DOCUMENTS

| | | | | |
|---|---|---|---|---|
| 2022/0048566 | A1* | 2/2022 | Prasad Challa | B60W 30/16 |
| 2022/0309806 | A1* | 9/2022 | Zhou | G06V 20/588 |
| 2022/0410886 | A1* | 12/2022 | Wallin | B60W 30/12 |
| 2023/0055708 | A1* | 2/2023 | Lee | B60W 60/001 |
| 2023/0304826 | A1* | 9/2023 | Zhang | G06N 3/045 |

FOREIGN PATENT DOCUMENTS

| | | | |
|---|---|---|---|
| CN | 106441319 | A | 2/2017 |
| CN | 109632333 | A | 4/2019 |
| CN | 109885635 | A | 6/2019 |

(Continued)

OTHER PUBLICATIONS

Office Action issued in Chinese Application No. 202111518699.7, mailed on May 22, 2025 (18 pages).

*Primary Examiner* — Hitesh Patel
*Assistant Examiner* — Ashleigh Nicole Turnbaugh
(74) *Attorney, Agent, or Firm* — Osha Bergman Watanabe & Burton LLP

(57) ABSTRACT

Provided are a vehicle navigation method, a vehicle and a storage medium. The vehicle navigation method includes: in response to a vehicle being in a driving state, obtaining environment information corresponding to the vehicle; obtaining lane information corresponding to the vehicle from a lane information set based on the environment information, in which the lane information includes first lane information of covered areas of a high-precision map and second lane information of uncovered areas of the high-precision map; and drawing a vehicle sign corresponding to the vehicle on the map based on the lane information, to provide navigation information for the vehicle.

13 Claims, 5 Drawing Sheets

(56) References Cited

FOREIGN PATENT DOCUMENTS

| | | | |
|---|---|---|---|
| CN | 110136222 | A | 8/2019 |
| CN | 112415552 | A | 2/2021 |
| CN | 112923948 | A | 6/2021 |
| CN | 113022573 | A | 6/2021 |
| GB | 2608190 | A | 12/2022 |
| WO | 2021157760 | A1 | 8/2021 |

* cited by examiner

VEHICLE NAVIGATION METHOD, VEHICLE AND STORAGE MEDIUM

CROSS-REFERENCE TO RELATED APPLICATIONS

This application is based on and claims priority to the Chinese Patent Application No. 202111518699.7, filed on Dec. 10, 2021, the entire content of which is incorporated herein by reference.

TECHNICAL FIELD

The disclosure relates to the field of computer technology, especially the technical field of intelligent transportation, in particular to a vehicle navigation method, a vehicle and a storage medium.

BACKGROUND

With the development of science and technology, smart vehicles are developing rapidly, and people, vehicles and roads are connected in a closer way. However, people's demands for transportation is also increasing, in order to improve the driving experience of drivers, various navigation methods have gradually emerged. Throughout the development of the vehicle navigation methods, vehicle self-positioning, map matching, route planning and navigation are achieved, and how to improve the navigation effectiveness has become a hot topic.

SUMMARY

The disclosure provides a vehicle navigation method, a vehicle and a storage medium, to improve the navigation effect for the vehicle and improve the user experience.

According to a first aspect of the disclosure, a vehicle navigation method is provided in embodiments. The method includes:

- in response to a vehicle being in a driving state, obtaining environment information corresponding to the vehicle;
- obtaining lane information corresponding to the vehicle from a lane information set based on the environment information, in which the lane information includes first lane information of covered areas of a high-precision map and second lane information of uncovered areas of the high-precision map; and
- drawing a vehicle sign corresponding to the vehicle on a map based on the lane information, to provide navigation information for the vehicle.

According to a second aspect of the disclosure, a vehicle is provided in embodiments. The vehicle includes: at least one processor and a memory communicatively coupled to the at least one processor. The memory stores instructions executable by the at least one processor, and when the instructions are executed by the at least one processor, the at least one processor is caused to implement the method according to embodiments in the first aspect of the disclosure.

According to a third aspect of the disclosure, a non-transitory computer-readable storage medium having computer instructions stored thereon is provided in embodiments. The computer instructions are configured to cause a computer to implement the method according to embodiments in the first aspect of the disclosure.

According to one or more related embodiments of the disclosure, in response to a vehicle being in a driving state, the environment information corresponding to the vehicle is obtained. The lane information corresponding to the vehicle is obtained from the lane information set based on the environment information. The lane information includes the first lane information of covered areas of the high-precision map and the second lane information of uncovered areas of the high-precision map. The vehicle sign corresponding to the vehicle is drawn on the map based on the lane information, to provide the navigation information for the vehicle. Since the lane information includes the first lane information and the second lane information, the lane information corresponding to the vehicle can also be obtained in the uncovered areas of the high-precision map, and the vehicle sign corresponding to the vehicle is drawn on the map, so that the occurrence of map image jumping when switching between the uncovered areas of the high-precision map and the covered areas of the high-precision map during traveling of the vehicle can be reduced. Therefore, lane-level navigation information is provided when the vehicle travels through the uncovered areas of the high-precision map, to improve the navigation effect in the uncovered areas of the high-precision map, improve the navigation effect during traveling of the vehicle, and improve the user experience.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the illustrative embodiments of the disclosure with reference to the accompanying drawings, which includes various details of the embodiments of the disclosure to facilitate understanding, which shall be considered merely illustrative. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

With the development of science and technology, smart vehicles are developing rapidly. The navigation system is a key component of a smart vehicle, and serves as a basis for making a control decision of a driver when driving the smart vehicle. In order to improve the driver's driving experience, various vehicle navigation methods have emerged.

Figure 1:
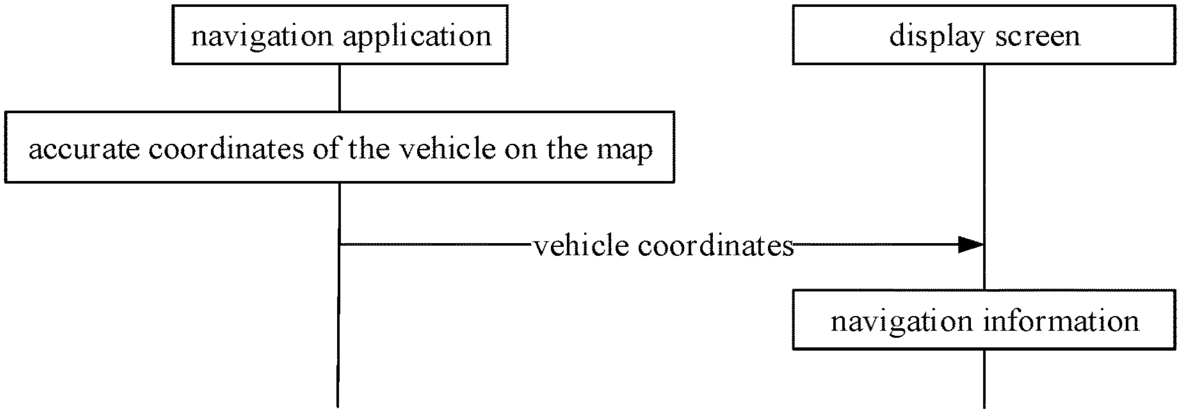
FIG. 1 is a schematic diagram of background of a vehicle navigation method used to implement the embodiments of the disclosure.

In some embodiments, FIG. 1 is a schematic diagram of background of a vehicle navigation method used to implement the embodiments of the disclosure. As illustrated in FIG. 1, when a driver drives a vehicle, a terminal may obtain the exact coordinates of the vehicle in the map based on a navigation application. The terminal may provide the driver with the navigation information such as an optimal driving route and a front road condition on a display screen of the vehicle based on the coordinate information.

Figure 2:
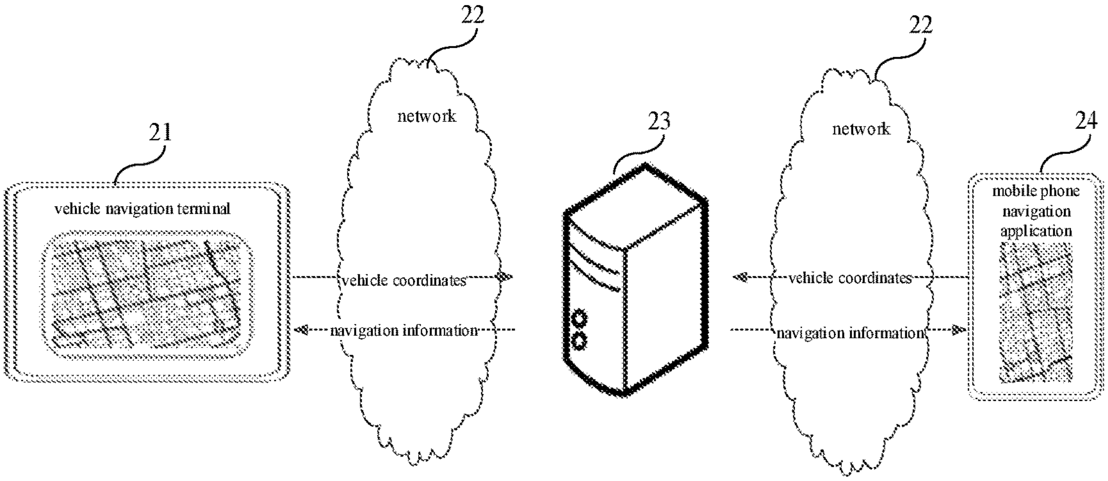
FIG. 2 is a schematic diagram of a system of a vehicle navigation method used to implement the embodiments of the disclosure.

In some embodiments, FIG. 2 is a schematic diagram of a system of a vehicle navigation method used to implement the embodiments of the disclosure. As illustrated in FIG. 2, an in-vehicle navigation terminal 21 and a mobile phone terminal 24 are connected to a server 23 via a network 22. The server 23 sends the navigation information to the in-vehicle navigation terminal 21 and the mobile phone terminal 24 based on vehicle coordinate information obtained by the in-vehicle navigation terminal 21 and the mobile phone terminal 24 and the high-precision map data stored in the server 23. The driver can obtain the navigation information corresponding to the vehicle on the display screen of the in-vehicle navigation terminal 21 and the display screen of the mobile phone terminal 24.

It is easy to understand that the driver can also navigate based on the vehicle's own map. However, due to the limited coverage of the high-precision map, the vehicle is unable to provide the driver with the lane-level navigation information in the uncovered areas of the high-precision map, and the navigation effect is poor, thereby affecting the user experience.

The disclosure is described in detail below in combination with specific embodiments.

Figure 3:
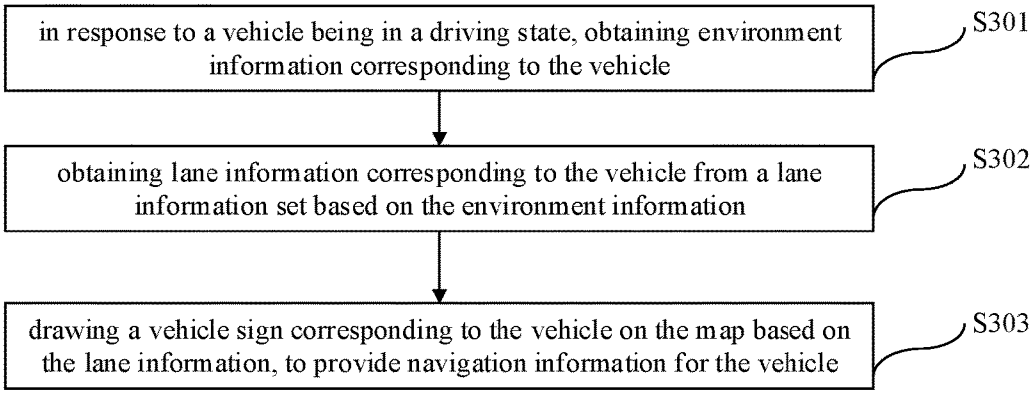
FIG. 3 is a schematic flowchart of a vehicle navigation method according to the first embodiment of the disclosure.

In the first embodiment, as illustrated in FIG. 3, FIG. 3 is a schematic flowchart of a vehicle navigation method according to the first embodiment of the disclosure. The method may be implemented depending on computer programs that run on a vehicle navigation apparatus. The computer programs may be integrated in an application or may run as independent tool applications.

In specific, the vehicle navigation method further includes the following blocks.

At block S301, in response to a vehicle being in a driving state, environment information corresponding to the vehicle is obtained.

In some embodiments, the subject of execution in the vehicle navigation method of the disclosure may, for example, be a vehicle. For example, the vehicle may be a smart vehicle. The vehicle does not specifically refer to a fixed vehicle. For example, when the type of vehicle changes, the vehicle may also change accordingly. The type of vehicle includes, but is not limited to, a car, a sport car, a van, or an off-road vehicle.

In some embodiments, the environment information refers to information corresponding to the environment where the vehicle is currently in during the traveling of the vehicle. This environment information does not specifically refer to fixed information. For example, when the traveling time of the vehicle changes, the environment information may also change accordingly. For example, when the location of the vehicle changes, the environment information may also change accordingly.

In some embodiments, the driving state means that the vehicle is in a non-stationary state, for example, there is a relative displacement between the vehicle and any of surrounding stationary objects. This driving state does not specifically refer to a fixed state. That is, it is detected that the current speed of the vehicle is not zero.

It is easily understood that when the vehicle executes the vehicle navigation method, the vehicle may detect the current state of the vehicle. If the vehicle is in the driving state, the vehicle may obtain the environment information corresponding to the vehicle.

At block S302, lane information corresponding to the vehicle is obtained from a lane information set based on the environment information.

In some embodiments, the lane information is the lane information corresponding to the vehicle, which may include, for example, a location of the vehicle relative to a road center, a lane in which the vehicle is located on the road, and a traveling direction of the vehicle.

In some embodiments, the lane information set is a combined-information set including at least one lane information. For example, the lane information set may include, a correspondence between the environment information and the lane information. That is, the vehicle may obtain the environment information and the lane information corresponding to the environment information in advance and store the environment information in association with the lane information corresponding to the environment information.

It is easy to understand that the lane information set does not specifically refer to a fixed information set. For example, when the amount of the lane information included in the lane information set changes, the lane information set may also change accordingly. For example, when the correspondence between the environment information and the lane information included in the lane information set changes, the lane information set may also change accordingly.

In some embodiments, the lane information corresponding to the vehicle includes first lane information of covered areas of a high-precision map and second lane information of uncovered areas of the high-precision map. The high-precision map includes, but is not limited to, a high-precision map or a lane-level map. The first lane information refers to lane information corresponding to the vehicle in the covered areas of the high-precision map, and the first lane information does not specifically refer to fixed information. For example, when the covered areas of the high-precision map change, the first lane information may also change accordingly. For example, when a driving route of the vehicle changes, the first lane information may also change accordingly.

In some embodiments, the second lane information refers to lane information corresponding to the vehicle in the uncovered areas of the high-precision map, and the second lane information does not refer to fixed information. For example, when the uncovered areas of the high-precision map change, the second lane information may also change accordingly. For example, when the driving route of the vehicle changes, the second lane information may also change accordingly.

It is easy to understand that when the vehicle executes the vehicle navigation method, the vehicle detects the current state of the vehicle. If the vehicle is in the driving state, the vehicle may obtain the environment information corresponding to the vehicle. Based on the environment information, the vehicle may obtain the lane information corresponding to the vehicle from the lane information set. That is, the vehicle may obtain the first lane information of the covered areas of the high-precision map and the second lane information corresponding to the uncovered areas of the high-precision map.

At block S303, a vehicle sign corresponding to the vehicle is drawn on the map based on the lane information, to provide navigation information for the vehicle.

In some embodiments, the vehicle sign is a sign that uniquely identifies a vehicle on the map and does not specifically refer to a fixed vehicle sign. For example, when a vehicle receives a modification instruction for the sign, the vehicle can modify the sign based on the modification instruction, and the sign may be modified accordingly. The map is a graph drawn on a certain carrier integrally according to a certain drawing rule by a drawing method, to present spatial distribution, connections, and development and change of state over time of various things on the Earth (or other celestial bodies).

It is easy to understand that the navigation information is driving information provided for the vehicle. The navigation information may be navigation information provided to the user while the user is driving the vehicle, or it may be navigation information provided during automatically driving. The navigation information does not specifically refer to fixed information. For example, when the first lane information or the second lane information changes, the navigation information may also change accordingly.

It is easy to understand that when the vehicle executes the vehicle navigation method, the vehicle may detect the current state of the vehicle. If the vehicle is in the driving state, the vehicle may obtain the environment information corresponding to the vehicle. Based on the environment information, the vehicle may obtain the lane information corresponding to the vehicle from the lane information set. That is, the vehicle may obtain the first lane information of the covered areas of the high-precision map and the second lane information corresponding to the uncovered areas of the high-precision map. When the vehicle obtains the lane information corresponding to the vehicle, the vehicle may, based on the lane information, draw the vehicle sign corresponding to the vehicle on the map, so as to provide the vehicle with the navigation information.

In one or more related embodiments of the disclosure, in response to a vehicle being in a driving state, the environment information corresponding to the vehicle is obtained. The lane information corresponding to the vehicle is obtained from the lane information set based on the environment information. The lane information includes the first lane information of the covered areas of the high-precision map and the second lane information of the uncovered areas of the high-precision map. The vehicle sign corresponding to the vehicle is drawn on the map based on the lane information, to provide the navigation information for the vehicle. Since the lane information includes the first lane information and the second lane information, the lane information corresponding to the vehicle can also be obtained in the uncovered areas of the high-precision map, and the vehicle sign corresponding to the vehicle is drawn on the map, so that the occurrence of map image jumping when switching between the uncovered areas of the high-precision map and the covered areas of the high-precision map during traveling of the vehicle can be reduced. Therefore, the lane-level navigation information is provided when the vehicle travels through the uncovered areas of the high-precision map, to improve the navigation effect in the uncovered areas of the high-precision map, and improve the user experience.

Figure 4:
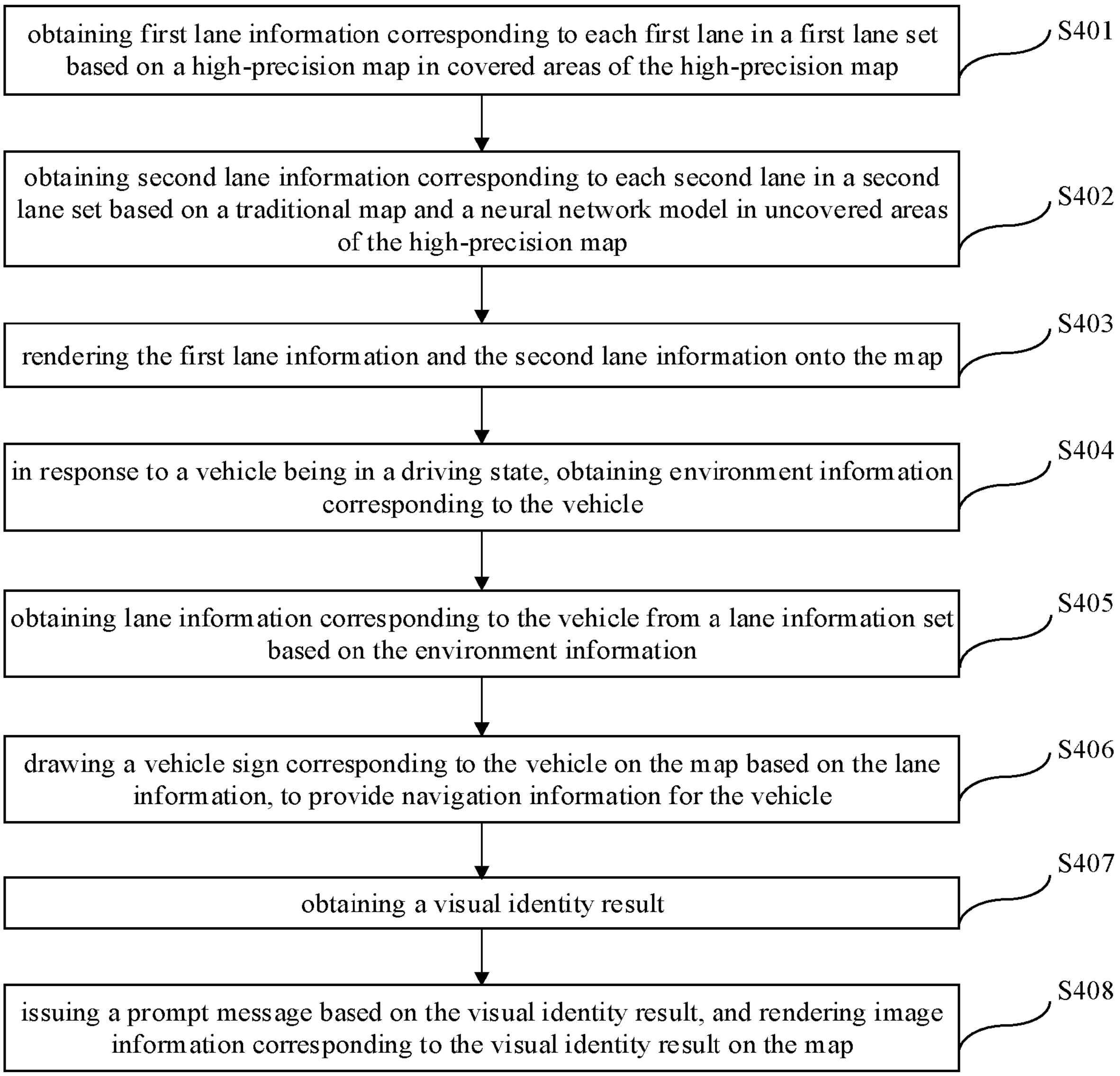
FIG. 4 is a schematic flowchart of a vehicle navigation method according to the second embodiment of the disclosure.

As illustrated in FIG. 4, FIG. 4 is a schematic flowchart of a vehicle navigation method according to the second embodiment of the disclosure.

At block S401, first lane information corresponding to each first lane in the first lane set is obtained based on the high-precision map in the covered areas of the high-precision map.

In some embodiments, the subject of execution in embodiments of the disclosure is a vehicle, which may be, for example, a smart car. The high-precision map is an electronic map with increased accuracy and more data dimensions. The high-precision map may include, for example, road shapes, the number of lanes, lane widths, speed limits, box junction signs, and the like. The high-precision map does not specifically refer to a fixed map. For example, when the elements included in the high-precision map changes, the high-precision map may also change accordingly.

It is easy to understand that due to the demanding acquisition process of the high-precision map, the covered areas of the high-precision map are limited. The covered areas of the high-precision map are areas that can be covered by the high-precision map. That is, the vehicle in the covered areas of the high-precision map can directly obtain the map information from the high-precision map.

In some embodiments, the lane information set includes a first lane set and a second lane set. The first lane set includes lanes included in the covered areas of the high-precision map. The first lane set does not specifically refer to a fixed lane set. For example, when the number of the first lanes included in the first lane set changes, the first lane set may also change accordingly. For example, when the covered areas of the high-precision map change, the first lane set may also change accordingly.

In some embodiments, the first lanes are lanes included in the covered areas of the high-precision map. The first lane information is the lane information corresponding to the first lanes. The first lane information includes, but is not limited to, road shapes of the first lanes, the number of lanes included in the road where the first lanes are located, lane widths of the first lanes, speed limit information of the respective first lanes, and the like.

It is easy to understand that in the covered areas of the high-precision map, the smart car can obtain the first lane information corresponding to each first lane in the first lane set based on the high-precision map.

At block S402, second lane information corresponding to each second lane in the second lane set is obtained based on a traditional map and a neural network model in the uncovered areas of the high-precision map.

In some embodiments, the uncovered areas of the high-precision map are areas that are not covered by the high-precision map. The traditional map, also known as the SD Map, only includes road names, roadway grades, road shapes and the number of lanes due to the limitation of map accuracy and map elements, and does not include lane widths, speed limits of lanes, box junction signs, and road measurement accessory attribute information. The road measurement accessory attribute information includes but is not limited to green belt, iron fence, and stationary parking hours.

It is easy to understand that the second lane set is a set of lanes included in the uncovered areas of the high-precision map. The second lane set does not specifically refer to a fixed lane set. For example, when the number of the second lanes included in the second lane set changes, the second lane set may also change accordingly. For example, when the uncovered areas of the high-precision map change, this second lane set may also change accordingly. For example, when an area A changes from an uncovered area of the high-precision map to a covered area of the high-precision map, both the first lane set and the second lane set may change accordingly.

In some embodiments, the second lanes are lanes included in the uncovered areas of the high-precision map. The second lane information refers to the lane information corresponding to the second lanes. The second lane information includes, but is not limited to, road shapes of the second lanes, the number of lanes included in the road where the second lanes are located, lane widths of the second lanes, and the speed limit information of the second lanes.

In some embodiments, due to the limitation of the traditional map, the smart car may obtain the second lane information corresponding to each second lane in the second lane set based on the traditional map and the neural network model.

It is easy to understand that the neural network model is used to fit lane widths of SD road networks that are not covered by lane-level road networks, i.e., the lane widths of SD road networks in the uncovered areas of the high-precision map. For example, training sample data may be obtained and used to train an original neural network model to obtain the neural network model. The training sample data includes, but is not limited to, a road image corresponding to any area of the uncovered areas of the high-precision map, roadway grades of roads in said area, the number of lanes of roads in said area, and high-precision map information corresponding to said area. The high-precision map information corresponding to said area includes, but is not limited to, information of a nearest covered area of the high-precision map spacing from said area, the roadway grades and lane widths information of the nearest covered area of the high-precision map, and spacing distances from said area. The information of the nearest covered area of the high-precision map spacing from said area may be obtained, for example, by selecting from N road sections in front of said area and N road sections behind said area, where N is a positive integer.

In some embodiments, when training the neural network model with the training sample data, before inputting the training sample data to the neural network model as input data, Embedding is performed on the training sample data, that is, transforming the training sample data from discrete variables to continuous vectors. After inputting the training sample data to the neural network model as input data, the neural network model can output the lane widths of lanes corresponding to any area of the uncovered areas of the high-precision map, that is, the lane width information corresponding to any area of the uncovered areas of the high-precision map can be obtained.

In some embodiments, validation sample data can also be obtained to validate the neural network model. If it is detected that the validation result satisfies the validation requirements, the neural network model is obtained, thus the accuracy of the obtained neural network model can be improved, and the accuracy of the navigation information can be improved.

In some embodiments, the validation sample data may be, for example, lane-level data already available in the traditional map, such as, lane width information already measured in the traditional map. The neural network may be, for example, a deep neural network, which includes, but is not limited to, Method of NN Structure Optimization Design Based on Uniform Design (NN), Multilayer Perceptron (MLP), Convolutional Neural Networks (CNN), Long Short-Term Memory (LSTM), Bi-directional Long Short-Term Memory (Bi-LSTM) and other models.

In some embodiments, when obtaining the second lane information corresponding to each second lane in the second lane set based on the traditional map and the neural network model in the uncovered areas of the high-precision map, the lane number and the lane shape information corresponding to any area of the uncovered areas of the high-precision map may be obtained based on the traditional map. The smart car may obtain a second lane subset corresponding to said any area. The smart car may obtain the second lane subset corresponding to said area. That is, the smart car may obtain the lane number, the lane shape information, and the second lane subset corresponding to the same area. The first lane width information corresponding to at least one second lane in the second lane subset can be obtained using the neural network model, and the second lane information corresponding to each second lane in the second lane subset is obtained based on the lane number, the lane shape information and the first lane width information corresponding to at least one second lane. The smart car may traverse the uncovered areas of the high-precision map and obtain the second lane information corresponding to each second lane in the second lane set. The first lane width information corresponding to the second lanes, and the lane width information of each second lane in the uncovered areas of the high-precision map can be obtained using the neural network model, which can reduce the occurrence of map image jumping when the vehicle switches between the uncovered areas of the high-precision map and the covered areas of the high-precision map, thereby improving the navigation effect in the uncovered areas of the high-precision map and improving the user experience.

In some embodiments, the second lane subset is a lane set corresponding to any area of the uncovered areas of the high-precision map. The second lane subset is a subset of the second lane set, and the second lane subset does not specifically refer to a fixed subset. For example, when said area changes, the second lane subset may also change accordingly.

It is easy to understand that the first lane width information is lane width information corresponding to the second lanes. This first lane width information does not refer to fixed information. For example, when the lane number corresponding to the second lane changes, the first lane width information may also change accordingly. For example, when the lane shape information corresponding to the second lane changes, the first lane width information may also change accordingly.

In some embodiments, the second lane information refers to the lane information corresponding to the second lane, which does not specifically refer to fixed information. The second lane information may be determined, for example, by the smart car based on the lane number and the lane shape information obtained from the traditional map in the uncovered areas of the high-precision map, and the first lane width information obtained by the neural network model. For example, when the first lane width information changes, the second lane information may also change accordingly.

In some embodiments, the second lanes included in the second lane subset may be, for example, a lane B1, a lane B2, a lane B3, a lane B4, a lane B5, and a lane B6. For example, the smart car may obtain the first lane width information corresponding to the lane B1 (e.g., 2.8 meters), the first lane width information corresponding to the lane B2 (e.g., 2.8 meters), the first lane width information corresponding to the lane B3 (e.g., 3 meters), the first lane width information corresponding to the lane B4 (e.g., 3 meters), the first lane width information corresponding to the lane B5 (e.g., 3.75 meters), and the first lane width information corresponding to the lane B6 (e.g., 3.5 meters). The second lane information corresponding to the lane B6 may be, for example, the first lane near the center of a four-lane road where the lane shape information is a main road.

In some embodiments, when obtaining the first lane width information corresponding to the at least one second lane in the second lane subset using the neural network model, the high-precision map information corresponding to said any area may be obtained, and the high-precision map information includes roadway grades, second lane width information, and spacing distances from said any area. The smart car may collect a road image of said any area, and obtain the first lane width information corresponding to the at least one second lane in the second lane subset corresponding to said any area based on the road image and the high-precision map information using the neural network model.

In some embodiments, the high-precision map information includes the roadway grades, the second lane width information, and the spacing distances from said any area. Said any area here refers to any area in the uncovered areas of the high-precision map. The high-precision map information refers to map information corresponding to the covered areas of the high-precision map around said any area, which may include, for example, N road sections in front of said any area and N road sections behind said any area, where N is a positive integer. The second lane width information is the lane width information corresponding to the lanes in the covered areas of the high-precision map around said any area. The second lane width information does not refer to specific lane width information. For example, when said any area in the uncovered areas of the high-precision map changes, the high-precision map information corresponding to said any area may change accordingly, and the second lane width information may also change accordingly.

In some embodiments, the spacing distance from said any area is a spacing distance between said any area and a covered area of the high-precision map corresponding to said any area. The spacing distance does not specifically refer to a fixed distance, for example, when said any area changes, the spacing distance may also change accordingly.

In some embodiments, the road image of said any area is a road image collected for the current area. The road image does not specifically refer to a fixed image. For example, when image elements included in the road image change, the road image may also change accordingly. For example, when resolution of a camera for collecting the road image changes, the road image may also change accordingly.

In some embodiments, when the smart car obtains the second lane information corresponding to each second lane in the second lane subset based on the lane number, the lane shape information and the first lane width information corresponding to the at least one second lane, equidistant segmentation is performed on the first lane width information, to obtain segmented first lane width information; and the second lane information corresponding to each second lane in the second lane subset is obtained based on the lane number, the lane shape information, and the segmented first lane width information. Therefore, the accuracy of the obtained lane width information can be improved, and the navigation effect can be improved by reducing the situation where the lane width information suddenly changes.

In some embodiments, the first lane width information may be, for example, 8-10 meters. The lane length may be, for example, 5 kilometers. The first lane width information is segmented, for example, by a difference of 0.5 meters between adjacent segmented first lane width information, and the segmented first lane width information thus obtained may be, such as, 8.5 meters, 9 meters, 9.5 meters, and 10 meters. Based on the lane number, the lane shape information and the segmented first lane width information, the second lane information corresponding to each second lane in the second lane subset is obtained, for example, the lane width of the lane B6 may be 8.5 meters within 1.25 km, 9 meters within 1.25 km-2.5 km, 9.5 meters within 2.5 km-3.75 km, and 10 meters within 3.75 km-5 km.

In some embodiments, when obtaining the second lane information corresponding to each second lane in the second lane subset based on the lane number, the lane shape information and the first lane width information corresponding to the at least one second lane, a smoothing process is performed on the first lane width information corresponding to the at least one second lane, to obtain third lane width information corresponding to the at least one second lane; and the second lane information corresponding to each second lane in the second lane subset is obtained based on the lane number, the lane shape information, and the third lane width information corresponding to the at least one second lane. Therefore, the accuracy of the obtained lane width information can be improved, and the navigation effect can be improved by reducing the situation where the lane width information suddenly changes.

In some embodiments, the smoothing process may be, for example, an interrupting differential calculation process, for example, the lane width of the lane B6 is 8.5 m within 1.25 km, 9 m within 1.25 km-2.5 km, 9.5 m within 2.5 km-3.75 km, and 10 m within 3.75 km-5 km. For example, the interrupting differential calculation process may be performed at 1.25 km to reduce the situation where the lane width jumps from 8.5 m to 9 m at 1.25 km.

At block S403, the first lane information and the second lane information are rendered onto the map.

In some embodiments, when the smart car obtains the first lane information and the second lane information, the smart car may render the first lane information and the second lane information onto the map, which can enrich the lane information in the uncovered areas of the high-precision map and can improve the navigation experience when using this map.

At block S404, in response to a vehicle being in a driving state, environment information corresponding to the vehicle is obtained.

The specific process is described above and will not be repeated herein.

In some embodiments, when obtaining the environment information corresponding to the vehicle, the smart car may obtain sensor data collected by at least one sensor in a sensor set and obtain the environment information corresponding to the vehicle based on the sensor data. In some embodiments, when obtaining the environment information corresponding to the vehicle, the smart car may obtain the environment information corresponding to the vehicle in response to obtaining environment information from a smart terminal. The smart car may also obtain the environment information corresponding to the vehicle by obtaining the environment information from a server. The environment information sent by the server may be obtained by the server itself, and may also be sent by the terminal to the smart car via the server.

The terminal includes, but is not limited to, a wearable device, a handheld device, a personal computer, a tablet, an in-vehicle device, a smartphone, a computing device, or other processing device connected to a wireless modem. The terminal may be called by different names in different networks, such as, a user device, an access terminal, a user unit, a user station, a mobile station, a mobile desk, a remote station, a remote terminal, a mobile device, a user terminal, a terminal, a wireless communication device, a user agent or user device, a cellular phone, a cordless phone, a Personal Digital Assistant (PDA), a terminal in the 5th Generation Mobile Communication Technology (5G) network, the 4th Generation Mobile Communication Technology (4G) network, the 3rd-Generation Mobile Communication Technology (3G) network, or future evolutionary networks.

In some embodiments, the sensor set is a set of multiple sensors installed on the smart car. The sensor set does not specifically refer to a fixed set. For example, when the number of sensors included in the sensor set changes, the sensor set may also change accordingly. For example, when the type of sensors included in the sensor set changes, the sensor set may also change accordingly.

In some embodiments, the at least one sensor included in the sensor set includes, but is not limited to, a water temperature sensor, a distance sensor, a camera sensor, a radar sensor, a LIDAR sensor, and the like. The distance sensor may, for example, obtain the distances of the vehicle from both sides of the road.

It is easy to understand that the smart terminal may be a smart device set at an intersection, and the smart terminal may be, for example, a smart light pole. When the smart light pole obtains the current environment information, if it is detected that the smart car is located in the covered areas of the smart light pole, the smart light pole may send the current environment information to the smart car, and the smart car may obtain the environment information corresponding to the smart car.

It is easy to understand that the smart car may, for example, obtain the environment information sent by the smart terminal via the 5g-v2x standard (NRV2X standard) technology.

At block S405, lane information corresponding to the vehicle is obtained from a lane information set based on the environment information.

The detailed process is described above and will not be repeated here.

At block S406, a vehicle sign corresponding to the vehicle is drawn on the map based on the lane information, to provide navigation information for the vehicle.

The detailed process is described above and will not be repeated here.

At block S407, a visual identity result is obtained.

In some embodiments, a Visual Identity (VI) system is a system using systematic and unified visual symbols. VI is the concrete and visualized form of communication of static identification symbols, with the most items, the widest dimension and more direct effect.

In some embodiments, during the driving process, the smart car may obtain the VI result, which does not specifically refer to a fixed VI result. For example, when the road section of the smart car changes, the VI result may change accordingly. For example, when the speed limit information of the current road changes, the VI result may also change accordingly.

It is easy to understand that the visual VI result includes, but is not limited to, speed limit of the front road, box junctions, lane-level guide arrows, lane-level turn signs.

At block S408, a prompt message is issued based on the VI result, and image information corresponding to the VI result is rendered on the map.

The detailed process is described above and will not be repeated here.

In some embodiments, the prompt message refers to a prompt message corresponding to the VI result, the prompt message includes but is not limited to a voice prompt message, or a text prompt message. The prompt message does not specifically refer to a fixed prompt message. For example, when the VI result changes, the prompt message may also change accordingly. The prompt message may, for example, be sent from a speaker of the smart car.

Figure 5:
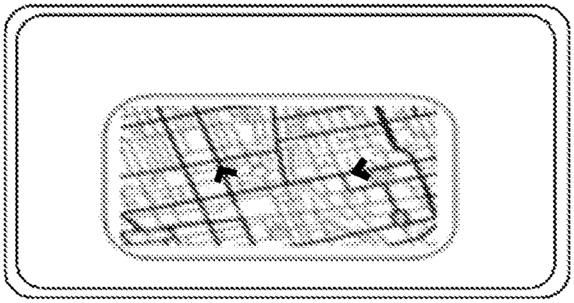
FIG. 5 is an illustrative schematic diagram of a display interface of an in-vehicle display screen according to the first embodiment of the disclosure.
Figure 6:
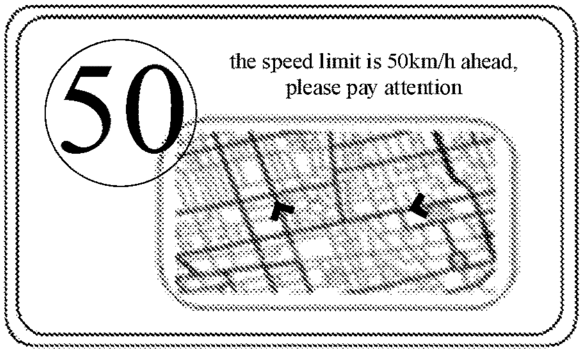
FIG. 6 is an illustrative schematic diagram of a display interface of an in-vehicle display screen according to the second embodiment of the disclosure.

In some embodiments, when the smart car obtains the VI result, the smart car may render the image information corresponding to the VI result on the map based on the VI result. The map may, for example, be displayed on an in-vehicle display screen. When the image information corresponding to the VI result is not rendered on the map, the display interface of the in-vehicle display screen may be, for example, as shown in FIG. 5. If the VI result may be, for example, the speed limit of 50 km/h ahead, the smart car may render the image information corresponding to the VI result on the map, and the display interface of the in-vehicle display screen may be, for example, as shown in FIG. 6.

The collection, storage, use, processing, transmission, provision and disclosure of the user's personal information involved in the technical solutions of the disclosure are handled in accordance with relevant laws and regulations and do not violate public order and morality.

In one or more related embodiments of the disclosure, in the covered areas of the high-precision map, the first lane information corresponding to each first lane in the first lane set is obtained based on the high-precision map, which improves the accuracy of the obtained first lane information. In the uncovered areas of the high-precision map, the second lane information corresponding to each second lane in the second lane set is obtained based on the traditional map and the neural network model. The first lane information and the second lane information are rendered onto the map. Since different lane information obtaining methods are adopted for different lanes, the accuracy of the obtained lane information is improved, the accuracy of map acquisition is improved, and the navigation effect is improved. Secondly, if the vehicle is in the driving state, the environment information corresponding to the vehicle is obtained, and the lane information corresponding to the vehicle is obtained from the lane information set based on the environment information, and the lane sign corresponding to the vehicle is drawn on the map based on the lane information, to provide the navigation information for the vehicle. Since the lane information includes the first lane information and the second lane information, the lane information corresponding to the vehicle can also be obtained in the uncovered areas of the high-precision map, and the vehicle sign corresponding to the vehicle is drawn on the map, so that the occurrence of map image jumping when switching between the uncovered areas of the high-precision map and the covered areas of the high-precision map during traveling of the vehicle can be reduced. Therefore, the lane-level navigation information can be provided in the uncovered areas of the high-precision map, which can improve the navigation effect in the uncovered areas of the high-precision map and improve the user experience. Finally, the VI result is obtained, and a prompt message is issued based on the VI result, and the image information corresponding to the VI result is rendered on the map, which can enrich the way of navigation during traveling of the vehicle, reduce the situation that the map elements in the traditional map are missing, and improve the user experience.

The followings are examples of apparatus embodiments of the disclosure that can be used to perform the method embodiments of the disclosure. For details not disclosed in the apparatus embodiments, the disclosed method embodiments may be referred to.

Figure 7A:
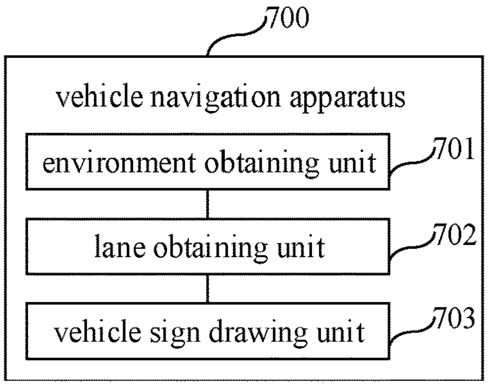
FIG. 7*a* is a schematic diagram of a first vehicle navigation apparatus for implementing the vehicle navigation method according to an embodiment of the disclosure.

FIG. 7*a* is a schematic diagram of a first vehicle navigation apparatus for implementing the vehicle navigation method according to an embodiment of the disclosure. As illustrated in FIG. 7*a*, a vehicle navigation apparatus 700 may be implemented as all or part of the apparatus by software, hardware, or a combination of both. The vehicle navigation apparatus 700 includes an environment obtaining unit 701, a lane obtaining unit 702, and a vehicle sign drawing unit 703.

The environment obtaining unit 701 is configured to, in response to a vehicle being in a driving state, obtain environment information corresponding to the vehicle.

The lane obtaining unit 702 is configured to obtain lane information corresponding to the vehicle from a lane information set based on the environment information. The lane information includes first lane information of covered areas of a high-precision map and second lane information of uncovered areas of the high-precision map.

The vehicle sign drawing unit 703 is configured to draw a vehicle sign corresponding to the vehicle on the map based on the lane information, to provide navigation information for the vehicle.

Figure 7B:
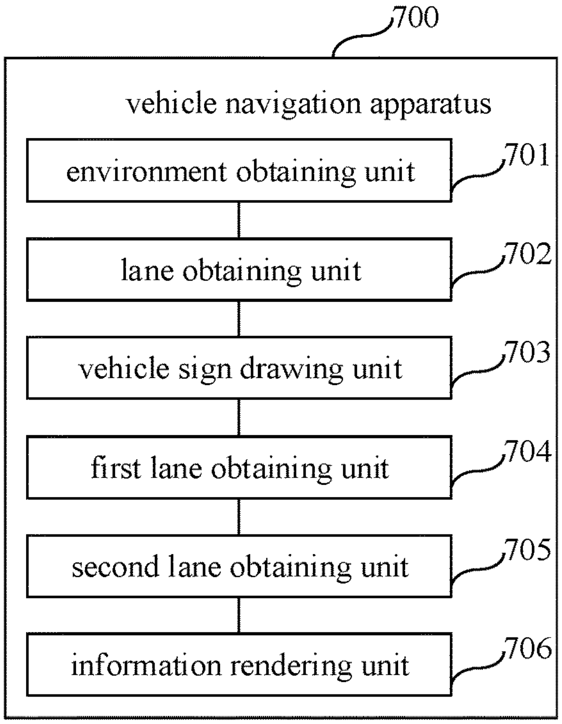
FIG. 7*b* is a schematic diagram of a second vehicle navigation apparatus for implementing the vehicle navigation method according to an embodiment of the disclosure.

In some embodiments, FIG. 7*b* is a schematic diagram of a second vehicle navigation apparatus for implementing the vehicle navigation method according to an embodiment of the disclosure. As illustrated in FIG. 7*b*, the lane information set includes a first lane set and a second lane set. The vehicle navigation apparatus 700 further includes a first lane obtaining unit 704, a second lane obtaining unit 705, and an information rendering unit 706.

The first lane obtaining unit 704 is configured to obtain first lane information corresponding to each first lane in the first lane set based on the high-precision map in the covered areas of the high-precision map.

The second lane obtaining unit 705 is configured to obtain second lane information corresponding to each second lane in the second lane set based on a traditional map and a neural network model in the uncovered areas of the high-precision map.

The information rendering unit 706 is configured to render the first lane information and the second lane information onto the map.

Figure 7C:
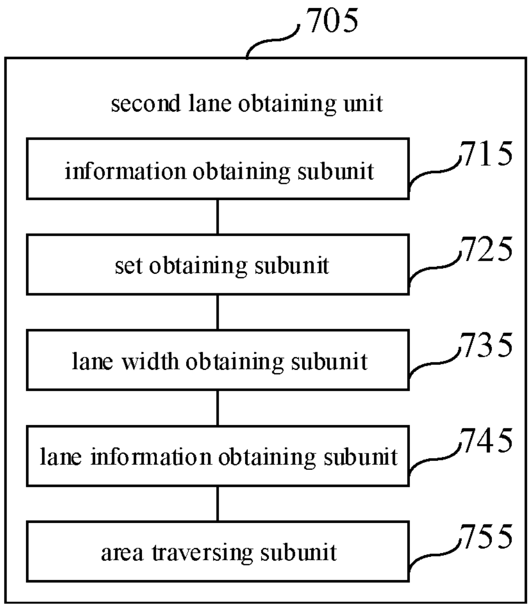
FIG. 7*c* is a schematic diagram of a third vehicle navigation apparatus for implementing the vehicle navigation method according to an embodiment of the disclosure.

In some embodiments, FIG. 7*c* is a schematic diagram of a third vehicle navigation apparatus for implementing the vehicle navigation method according to an embodiment of the disclosure. As illustrated in FIG. 7*c*, the second lane obtaining unit 705 includes an information obtaining subunit 715, a set obtaining subunit 725, a lane width obtaining subunit 735, a lane information obtaining subunit 745, and an area traversing subunit 755.

The information obtaining subunit 715 is configured to obtain a lane number and lane shape information corresponding to any area of the uncovered areas of the high-precision map based on the traditional map in the uncovered areas of the high-precision map.

The set obtaining subunit 725 is configured to obtain a second lane subset corresponding to said any area.

The lane width obtaining subunit 735 is configured to obtain first lane width information corresponding to at least one second lane in the second lane subset using the neural network model. The lane information obtaining subunit 745 is configured to obtain second lane information corresponding to each second lane in the second lane subset based on the lane number, the lane shape information, and the first lane width information corresponding to the at least one second lane.

The area traversing subunit 755 is configured to traverse the uncovered areas of the high-precision map, and obtain the second lane information corresponding to each second lane in the second lane set.

In some embodiments, when obtaining the first lane width information corresponding to the at least one second lane in the second lane subset using the neural network model, the lane width obtaining subunit 734 is further configured to:

- obtain high-precision map information corresponding to said any area, wherein the high-precision map information comprises roadway grades, second lane width information, and spacing distances from said any area;
- collect a road image of said any area; and
- obtain the first lane width information corresponding to the at least one second lane in the second lane subset corresponding to said any area using the neural network model based on the high-precision map information and the road image.

In some embodiments, when obtaining the second lane information corresponding to each second lane in the second lane subset based on the lane number, the lane shape information, and the first lane width information corresponding to the at least one second lane, the lane information obtaining subunit 744 is further configured to:

- perform equidistant segmentation on the first lane width information, to obtain segmented first lane width information; and
- obtain the second lane information corresponding to each second lane in the second lane subset based on the lane number, the lane shape information, and the segmented first lane width information.

In some embodiments, when obtaining the second lane information corresponding to each second lane in the second lane subset based on the lane number, the lane shape information, and the first lane width information corresponding to the at least one second lane, the lane information obtaining subunit 744 is further configured to:

- perform a smoothing process on the first lane width information corresponding to the at least one second lane, to obtain third lane width information corresponding to the at least one second lane; and
- obtain the second lane information corresponding to each second lane in the second lane subset based on the lane number, the lane shape information, and the third lane width information corresponding to the at least one second lane.

Figure 7D:
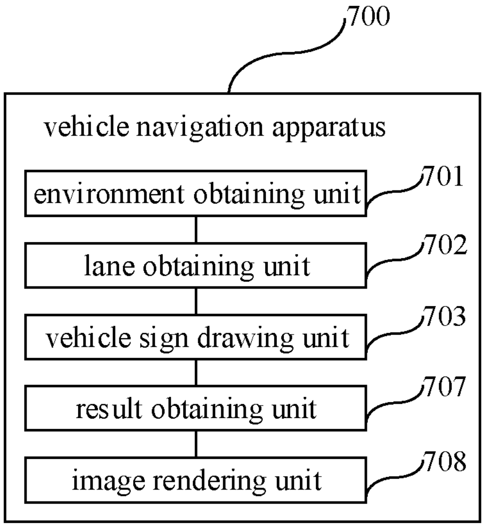
FIG. 7*d* is a schematic diagram of a fourth vehicle navigation apparatus for implementing the vehicle navigation method according to an embodiment of the disclosure.

In some embodiments, FIG. 7*d* is a schematic diagram of a fourth vehicle navigation apparatus for implementing the vehicle navigation method according to an embodiment of the disclosure. As illustrated in FIG. 7*d*, the vehicle navigation apparatus 700 further includes a result obtaining unit 707 and an image rendering unit 708.

The result obtaining unit 707 is configured to obtain a visual identity result.

The image rendering unit 708 is configured to issue a prompt message based on the visual identity result, and render image information corresponding to the visual identity result on the map.

In some embodiments, when obtaining the environment information corresponding to the vehicle in the driving state, the environment obtaining unit 701 is further configured to:

obtain sensor data collected by at least one sensor in a sensor set;

obtain the environment information corresponding to the vehicle based on the sensor data.

In some embodiments, when obtaining the environment information corresponding to the vehicle in the driving state, the environment obtaining unit 701 is further configured to:

obtain the environment information corresponding to the vehicle in response to obtaining environment information from a smart terminal.

It is to be noted that the vehicle navigation apparatus of the above embodiments in performing the vehicle navigation method is only illustrated by the division of each functional module described above. In practice, the above functions can be assigned to be performed by different functional modules according to the needs, that is, the internal structure of the apparatus is divided into different functional modules to perform all or some of the functions described above. In addition, the vehicle navigation apparatus of the above embodiments and the vehicle navigation method belong to the same idea, and its implementation process is described in detailed in the method embodiments, which will not be repeated here.

The above serial numbers of embodiments of the disclosure are for descriptive purposes only and do not represent the advantages or disadvantages of the embodiments.

In one or more related embodiments, the environment obtaining unit is configured to, in response to a vehicle being in a driving state, obtain environment information corresponding to the vehicle. The lane obtaining unit is configured to obtain lane information corresponding to the vehicle from a lane information set based on the environment information. The lane information includes first lane information of covered areas of a high-precision map and second lane information of uncovered areas of the high-precision map. The vehicle sign drawing unit is configured to draw a vehicle sign corresponding to the vehicle on the map based on the lane information, to provide navigation information for the vehicle. Since the lane information includes the first lane information and the second lane information, the lane information corresponding to the vehicle can also be obtained in the uncovered areas of the high-precision map, and the vehicle sign corresponding to the vehicle is drawn on the map, so that the occurrence of map image jumping when switching between the uncovered areas of the high-precision map and the covered areas of the high-precision map during traveling of the vehicle can be reduced. Therefore, the lane-level navigation information is provided when the vehicle travels through the uncovered areas of the high-precision map, to improve the navigation effect in the uncovered areas of the high-precision map, and improve the user experience.

In the technical solutions of the disclosure, acquisition, storage and application of the user's personal information involved are in accordance with the relevant laws and regulations and do not violate public order and morality.

The embodiments of the disclosure also provide a computer storage medium. The computer storage medium may store a plurality of instructions, which are suitable for loading by a processor and executing the method as shown in the embodiments of FIGS. 3-FIG. 6 above. The specific execution process of which can be found in the specific description of the embodiments shown in FIGS. 3-FIG. 6 and will not be repeated herein. The computer-readable storage medium may include, but is not limited to, any type of disk, including floppy disk, optical disc, DVD, CD-Read Only Memory (ROM), micro drive, magnetic disk, ROM, Random-Access Memory (RAM), Erasable Programmable Read Only Memory (EPROM), Electrically-Erasable Programmable Read Only Memory (EEPROM), Dynamic Random Access Memory (DRAM), Video RAM, flash memory devices, magnetic or optical cards, Nano systems (including molecular memory ICs), or any type of medium or device suitable for storing instructions and/or data.

The disclosure also provides a computer program product, which includes a non-volatile computer-readable storage medium storing computer programs. The computer program product stores at least one instruction, and the at least one instruction is loaded by a processor to implement the method as in the embodiments shown in FIGS. 3-FIG. 6 above. The specific execution of which can be found in the specific description of the embodiments shown in FIGS. 3-FIG. 6 and will not be repeated herein.

Figure 8:
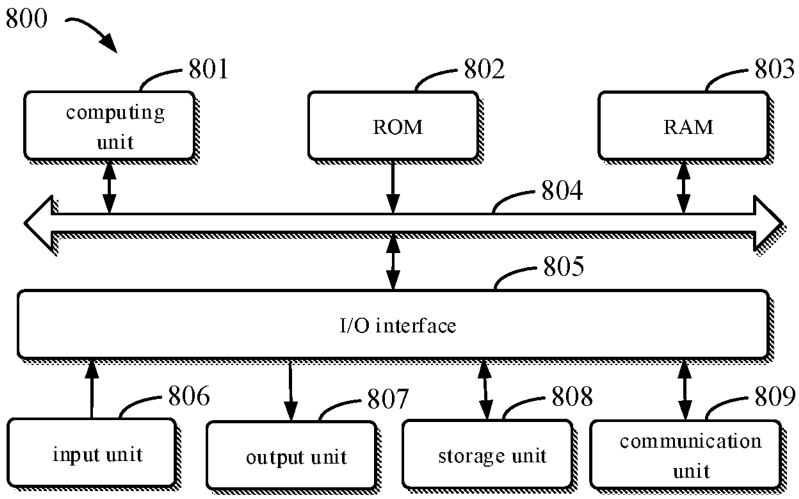
FIG. 8 is a schematic diagram of a vehicle used to implement the vehicle navigation method according to an embodiment of the disclosure.

FIG. 8 is a schematic diagram of a vehicle 800 used to implement the vehicle navigation method according to an embodiment of the disclosure. As illustrated in FIG. 8, the vehicle 800 includes a computing unit 801 that may perform various appropriate actions and processes based on the computer programs stored in a ROM 802 or loaded into a RAM 803 from a storage unit 808. In RAM 803, various programs and data required for operation of the vehicle 800 may also be stored. The computing unit 801, the ROM 802, and the RAM 803 are connected to each other via a bus 804. The input/output (I/O) interface 805 is also connected to the bus 804.

Components in the vehicle 800 are connected to the I/O interface 805, including: an input unit 806, such as a keyboard, a mouse; an output unit 807, such as various types of displays, speakers; a storage unit 808, such as a disk, an optical disk; and a communication unit 809, such as network cards, modems, and wireless communication transceivers. The communication unit 809 allows the vehicle 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a Central Processing Unit (CPU), a Graphics Processing Unit (GPU), various dedicated AI computing chips, various computing units that run machine learning model algorithms, a Digital Signal Processor (DSP), and any appropriate processor, controller and microcontroller. The computing unit 801 executes the various methods and processes described above, such as the vehicle navigation method. For example, in some embodiments, the method may be implemented as a computer software program, which is tangibly contained in a machine-readable medium, such as the storage unit 808. In some embodiments, part or all of the computer program may be loaded and/or installed on the vehicle 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

In addition, it will be understood by those skilled in the art that the structure of the vehicle shown in the accompanying drawings above does not constitute a limitation of the terminal, and that the terminal may include more or fewer components than shown, or a combination of certain components, or a different arrangement of components. For example, the terminal also includes components such as RF circuits, input units, sensors, audio circuits, Wireless Fidelity (Wi-Fi) modules, power supplies, Bluetooth modules, which will not be described herein.

In the embodiments of the disclosure, the subject of execution of the respective step may be the terminal as described above. In some embodiments, the execution subject of each step is an operating system of the terminal. The operating system may be an Android system, an IOS system, or other operating system, which is not limited in the embodiments of the disclosure.

According to the embodiments of the disclosure, a display device may be mounted on the terminal, the display device may be various devices capable of implementing the display function, such as, a Cathode Ray Tube (CRT) display, a Light-Emitting Diode Display (LED), an electronic ink screen, a Liquid Crystal Display (LCD), and a Plasma Display Panel (PDP). The user can use the display device on the terminal 100 to view displayed text, images, videos and other information. The terminal may be a smartphone, a tablet computer, a game device, an Augmented Reality (AR) device, a car, a data storage device, an audio playback device, a video playback device, a laptop, a desktop computing device, and wearable devices such as an electronic watch, an electronic glasses, an electronic helmet, an electronic bracelet, an electronic necklace, and electronic clothing.

It will be clear to those of skill in the art that the technical solution of the disclosure can be implemented with the aid of software and/or hardware. The terms "unit" and "module" in this specification refer to software and/or hardware that can perform a specific function independently or in combination with other components. The hardware can be, for example, a Field-Programmable Gate Array (FPGA), or Integrated Circuit (IC).

It should be noted that each of the preceding method embodiments is presented as a series of combinations of actions for simplicity of description, but those of skill in the art should be aware that the disclosure is not limited by the sequence of actions described, as certain steps may be performed in other sequences or simultaneously according to the disclosure. Secondly, those of skill in the art should also be aware that the embodiments described in the disclosure are all preferred embodiments and the actions and modules involved are not necessarily necessary for the disclosure.

In the above embodiments, the description of each embodiment has its own focus, and the parts of an embodiment that are not described in detail can be found in the relevant descriptions of other embodiments.

In the several embodiments of the disclosure, it should be understood that the disclosed apparatus, may be implemented in other ways. For example, the apparatus embodiments described above are merely illustrative, for example the division of the units described, is only a logical functional division, and the actual implementation can be divided in another way. For example, multiple units or components can be combined or integrated into another system, or some features can be ignored or not implemented. Moreover, the mutual coupling or direct coupling or communication connections shown or discussed can be indirect coupling or communication connections through some service interfaces, devices or units, either electrically or in other forms.

The units illustrated as separate components may or may not be physically separated, and the components displayed as units may or may not be physical units, i.e., they may be located in one place or may be distributed to a plurality of network units. Some or all of these units may be selected according to practical needs to achieve the purpose of this solution.

Alternatively, each functional unit in various embodiments of the disclosure may be integrated in a single processing unit, or each unit may be physically present separately, or two or more units may be integrated in a single unit. The above integrated unit can be implemented either in the form of hardware or in the form of software functional unit.

The integrated unit, when implemented as a software functional unit and sold or used as a separate product, may be stored in a computer readable memory. It is understood that the technical solution of the disclosure, or part or all of the technical solution that essentially contributes to the related art, may be embodied in the form of a software product stored in a memory including a number of instructions to cause a computer device (which may be a personal computer, a server, or a network device) to perform all or some of the steps of the method described in various embodiments of the disclosure. The aforementioned memory includes USB flash drives, ROM, RAM, mobile hard drives, disks or optical disks, and various other medium that can store program codes.

One of ordinary skill in the art can understand that all or some of the steps in the various methods of the above embodiments can be accomplished by means of programs to instruct the associated hardware, which can be stored in a computer-readable memory that include: a flash drive, ROM, RAM, disk or optical disk.

The foregoing are only illustrative embodiments of the disclosure and cannot be used to limit the scope of the disclosure. That is, all equivalent variations and modifications made in accordance with the teachings of the disclosure are still within the scope of the disclosure. Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

What is claimed is:

1. A vehicle navigation method, comprising:

in response to a vehicle being in a driving state, obtaining environment information corresponding to the vehicle;

obtaining lane information corresponding to the vehicle from a lane information set based on the environment information, wherein the lane information comprises first lane information of covered areas of a high-precision map and second lane information of uncovered areas of the high-precision map;

displaying a vehicle sign corresponding to the vehicle on a map based on the lane information, to provide navigation information for the vehicle; and controlling the vehicle to travel based on said navigation information when the vehicle travels through the uncovered areas of the high-precision map, wherein the lane information set comprises a first lane set and a second lane set, and before obtaining the environment information corresponding to the vehicle in the driving state, the method further comprises:

obtaining the first lane information corresponding to each first lane in the first lane set based on the high-precision map in the covered areas of the high-precision map;

obtaining the second lane information corresponding to each second lane in the second lane set based on a traditional map and a neural network model in the uncovered areas of the high-precision map; and rendering the first lane information and the second lane information onto the map, wherein obtaining the second lane information corresponding to each second lane in the second lane set based on the traditional map and the neural network model in the uncovered areas of the high-precision map, comprises:

obtaining a lane number and a lane shape information corresponding to any uncovered area of the high-precision map based on the traditional map in the uncovered areas of the high-precision map;

obtaining a second lane subset corresponding to said any uncovered area of the high-precision map;

obtaining a first lane width information corresponding to at least one second lane in the second lane subset using the neural network model;

obtaining a second lane information corresponding to each second lane in the second lane subset based on the lane number, the lane shape information, and the first lane width information corresponding to the at least one second lane; and traversing the uncovered areas of the high-precision map, and obtaining the second lane information corresponding to each second lane in the second lane set, wherein the second lane information is determined based on the lane number and the lane shape information obtained from the traditional map in the uncovered areas of the high-precision map, and the first lane width information obtained by the neural network model, wherein obtaining the first lane width information corresponding to the at least one second lane in the second lane subset using the neural network model, comprises:

obtaining high-precision map information corresponding to said any uncovered area of the high-precision map, wherein the high-precision map information corresponding to said any uncovered area of the high-precision map comprises:

both a roadway grade and a second lane width information for a nearest covered area of the high-precision map, and a spacing distance from said any uncovered area of the high-precision map to the nearest covered area of the high-precision map;

collecting a road image of said any uncovered area of the high-precision map; and obtaining the first lane width information corresponding to the at least one second lane in the second lane subset corresponding to said any uncovered area of the high-precision map using the neural network model based on the high-precision map information corresponding to said any uncovered area of the high-precision map and the road image of said any uncovered area of the high-precision map.

2. The method of claim 1, wherein obtaining the second lane information corresponding to each second lane in the second lane subset based on the lane number, the lane shape information, and the first lane width information corresponding to the at least one second lane, comprises:

performing equidistant segmentation on the first lane width information, to obtain segmented first lane width information; and obtaining the second lane information corresponding to each second lane in the second lane subset based on the lane number, the lane shape information, and the segmented first lane width information.

3. The method of claim 1, wherein obtaining the second lane information corresponding to each second lane in the second lane subset based on the lane number, the lane shape information, and the first lane width information corresponding to the at least one second lane, comprises:

performing a smoothing process on the first lane width information corresponding to the at least one second lane, to obtain third lane width information corresponding to the at least one second lane; and obtaining the second lane information corresponding to each second lane in the second lane subset based on the lane number, the lane shape information, and the third lane width information corresponding to the at least one second lane.

4. The method of claim 1, wherein after displaying the vehicle sign corresponding to the vehicle on the map based on the lane information, the method further comprises:

obtaining a visual identity result; and issuing a prompt message based on the visual identity result, and rendering image information corresponding to the visual identity result on the map.

5. The method of claim 1, wherein obtaining the environment information corresponding to the vehicle in the driving state comprises:

obtaining sensor data collected by at least one sensor in a sensor set;

obtaining the environment information corresponding to the vehicle based on the sensor data.

6. The method of claim 1, wherein obtaining the environment information corresponding to the vehicle in the driving state comprises:

obtaining the environment information corresponding to the vehicle in response to obtaining environment information from a smart terminal.

7. A vehicle, comprising:

at least one processor; and a memory communicatively coupled to the at least one processor, wherein the memory stores instructions executable by the at least one processor, when the instructions are executed by the at least one processor, the at least one processor is caused to implement a vehicle navigation method comprising:

in response to a vehicle being in a driving state, obtaining environment information corresponding to the vehicle;

obtaining lane information corresponding to the vehicle from a lane information set based on the environment information, wherein the lane information comprises first lane information of covered areas of a high-precision map and second lane information of uncovered areas of the high-precision map;

displaying a vehicle sign corresponding to the vehicle on a map based on the lane information, to provide navigation information for the vehicle; and control the vehicle to travel based on said navigation information when the vehicle travels through the uncovered areas of the high-precision map, wherein the lane information set comprises a first lane set and a second lane set, and before obtaining the environment information corresponding to the vehicle in the driving state, the vehicle navigation method further comprises:

obtaining the first lane information corresponding to each first lane in the first lane set based on the high-precision map in the covered areas of the high-precision map;

obtaining the second lane information corresponding to each second lane in the second lane set based on a traditional map and a neural network model in the uncovered areas of the high-precision map; and rendering the first lane information and the second lane information onto the map, wherein obtaining the second lane information corresponding to each second lane in the second lane set based on the traditional map and the neural network model in the uncovered areas of the high-precision map, comprises:

obtaining a lane number and a lane shape information corresponding to any uncovered area of the high-precision map based on the traditional map in the uncovered areas of the high-precision map;

obtaining a second lane subset corresponding to said any uncovered area of the high-precision map;

obtaining a first lane width information corresponding to at least one second lane in the second lane subset using the neural network model;

obtaining a second lane information corresponding to each second lane in the second lane subset based on the lane number, the lane shape information, and the first lane width information corresponding to the at least one second lane; and traversing the uncovered areas of the high-precision map, and obtaining the second lane information corresponding to each second lane in the second lane set, wherein the second lane information is determined based on the lane number and the lane shape information obtained from the traditional map in the uncovered areas of the high-precision map, and the first lane width information obtained by the neural network model, wherein obtaining the first lane width information corresponding to the at least one second lane in the second lane subset using the neural network model, comprises:

obtaining high-precision map information corresponding to said any uncovered area of the high-precision map, wherein the high-precision map information corresponding to said any uncovered area of the high-precision map comprises:

both a roadway grade and a second lane width information for a nearest covered area of the high-precision map, and a spacing distance from said any uncovered area of the high-precision map to the nearest covered area of the high-precision map;

collecting a road image of said any uncovered area of the high-precision map; and obtaining the first lane width information corresponding to the at least one second lane in the second lane subset corresponding to said any uncovered area of the high-precision map using the neural network model based on the high-precision map information corresponding to said any uncovered area of the high-precision map and the road image of said any uncovered area of the high-precision map.

8. The vehicle of claim 7, wherein obtaining the second lane information corresponding to each second lane in the second lane subset based on the lane number, the lane shape information, and the first lane width information corresponding to the at least one second lane, comprises:

performing equidistant segmentation on the first lane width information, to obtain segmented first lane width information; and obtaining the second lane information corresponding to each second lane in the second lane subset based on the lane number, the lane shape information, and the segmented first lane width information.

9. The vehicle of claim 7, wherein obtaining the second lane information corresponding to each second lane in the second lane subset based on the lane number, the lane shape information, and the first lane width information corresponding to the at least one second lane, comprises:

performing a smoothing process on the first lane width information corresponding to the at least one second lane, to obtain third lane width information corresponding to the at least one second lane; and obtaining the second lane information corresponding to each second lane in the second lane subset based on the lane number, the lane shape information, and the third lane width information corresponding to the at least one second lane.

10. The vehicle of claim 7, wherein after displaying the vehicle sign corresponding to the vehicle on the map based on the lane information, the vehicle navigation method further comprises:

obtaining a visual identity result; and issuing a prompt message based on the visual identity result, and rendering image information corresponding to the visual identity result on the map.

11. The vehicle of claim 7, wherein obtaining the environment information corresponding to the vehicle in the driving state comprises:

obtaining sensor data collected by at least one sensor in a sensor set;

obtaining the environment information corresponding to the vehicle based on the sensor data.

12. The vehicle of claim 7, wherein obtaining the environment information corresponding to the vehicle in the driving state comprises:

obtaining the environment information corresponding to the vehicle in response to obtaining environment information from a smart terminal.

13. A non-transitory computer-readable storage medium storing computer instructions, wherein the computer instructions are configured to cause a computer to implement a vehicle navigation method according to claim 1.

* * * * *